J. STANLEY.
COVERING FOR PEDALS AND THE LIKE.
APPLICATION FILED MAY 12, 1915.
1,175,387.
Patented Mar. 14, 1916.
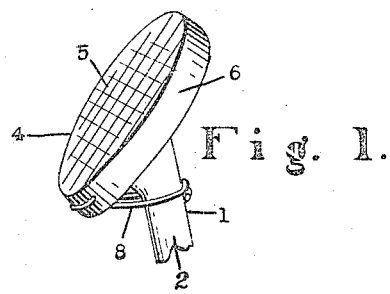
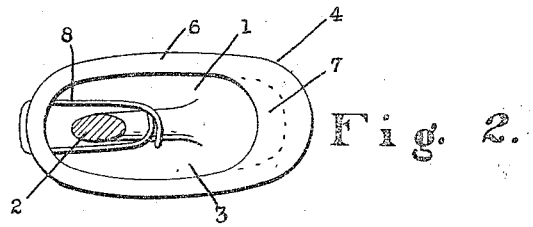
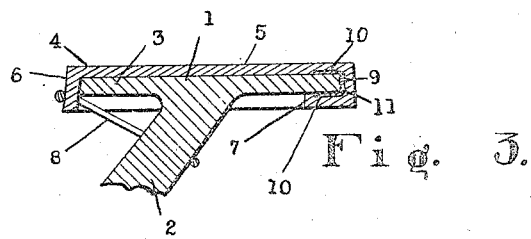
WITNESS
Howard P. King
INVENTOR:
James Stanley,
BY Russell M. Everett
ATTORNEY.

UNITED STATES PATENT OFFICE.

JAMES STANLEY, OF NEWARK, NEW JERSEY.

COVERING FOR PEDALS AND THE LIKE.

1,175,387.

Specification of Letters Patent.

Patented Mar. 14, 1916.

Application filed May 12, 1915. Serial No. 27,503.

*To all whom it may concern:*

Be it known that I, JAMES STANLEY, a citizen of the United States, and a resident of Newark, in the county of Essex and State of New Jersey, have invented certain Improvements in Coverings for Pedals and the like, of which the following is a specification.

The objects of this invention are to provide an improved covering for pedals or the like, especially automobile pedals; to provide a construction which is readily made from rubber; to provide means for attaching the covering to the pedal; to thus prevent the inadvertent removal of the covering during use; to secure simplicity of construction and operation, and to obtain other advantages and results as may be brought out in the following description.

Referring to the accompanying drawings, in which like numerals of reference indicate the same parts throughout the several views, Figure 1 is a perspective view of a pedal having a covering thereon embodying my invention; Fig. 2 is an underneath view of the same, and Fig. 3 is a vertical longitudinal section of the same.

In the specific embodiment of the invention illustrated in said drawings, the reference numeral 1 indicates a pedal having a shank 2 and a transverse plate or foot rest 3. It will be understood that such pedals are in use for such purposes as operating the clutch or brake on automobiles, and are positioned so as to be operated by the driver's foot. Upon the upper side of the transverse plate 3 of the pedal I apply my covering for preventing the operator's foot from slipping when he attempts to manipulate the pedal.

Referring more particularly to the construction of the covering 4 shown, the same comprises a portion 5 adapted to lie flatwise upon the upper side of the pedal and conforming substantially to the shape thereof. The upper or exposed side of this portion 5 is preferably roughened in any suitable manner, as by transverse ribs, so as to form a positive foot-hold for the operator. Depending from the periphery of the covering below the edge of the pedal plate 3 is a flange or skirt 6 preferably extending the entire distance around the pedal and integral with the portion 5 of the covering. When the covering 4 is placed upon the pedal so that the skirt depends around the edge of the plate, movement of the covering flatwise of the plate is prevented by engagement of the flange or skirt therewith. In order to prevent the covering from being lifted up and removed, one end thereof is provided with a lip 7 adapted to underlie the end of the pedal plate. Preferably this lip or underlying portion 7 is integral with the flange 6 and spaced from the top portion 5 substantially parallel thereto. To apply the covering 4 as thus constructed to the pedal, the plate is inserted between opposite side portions of the flange 6, and the covering then slid so that the plate enters the pocket formed between the top portion 5 and the underlying portion 7, and the opposite end of the top portion 5 can then be laid down flat upon the plate 3. Obviously the end having the underlying portion 7 cannot be raised as long as the covering cannot be slid longitudinally of the plate, and in order to hold the end of the covering opposite from the underlying portion 7 from rising up, a wire or tie 8 is inserted through said opposite portion of the flange 6 and drawn around the shank 2 of the pedal. In order to prevent the corner of the pedal within the pocket between the top portion 5 and the underlying lip 7 from cutting the covering, I preferably insert a separable metal shield or toe 9 comprising opposite parallel portions 10, 10 lying above and below the plate integrally connected by a portion 11 extending around the edge or toe of the plate.

It will be obvious that my improved pedal covering may be used upon any of the various pedals now upon the market, and may be made the proper shape and size to fit the same. Preferably the coverings are pressed from rubber, although it will be understood that other materials found suitable for obtaining a frictional contact with the operator's shoe may be employed. It is also deemed within the scope of the invention to employ other means than those specifically shown for securing the covering at its end away from the lip against inadvertent removal from the pedal. Furthermore, other detail modifications and changes may be made in manufacturing my improved covering for pedals, without departing from the spirit and scope of the invention, and I do not wish to be understood as restricting myself, except as required by the following claims when construed in the light of the prior art.

Having thus described the invention, what I claim is:—

1. A covering for pedals and the like comprising a flat portion adapted to overlie a pedal plate, a peripheral flange adapted to depend around the sides of said plate, a lip at one end of said covering integral with the flange, means adapted to overlie the toe of the pedal to prevent cutting the covering, and means for holding the opposite end of the covering flatwise against the pedal plate.

2. In a covering for pedals and the like comprising an upper portion adapted to lie flatwise upon the pedal plate, a peripheral flange adapted to depend around the edge of said plate, an inwardly directed lip at the toe portion of the pedal extending substantially parallel to the upper portion and adapted to underlie the pedal plate, said lip extending peripherally of the covering for only the toe portion of the pedal and discontinued for the rest of its circumference, and a tie projecting inwardly from the said peripheral flange at the opposite end of the covering from said lip and adapted to be secured to the pedal.

JAMES STANLEY.